(12) United States Patent
Derose

(10) Patent No.: US 6,338,418 B1
(45) Date of Patent: Jan. 15, 2002

(54) PROTECTIVE SEAL FOR CANS

(76) Inventor: Mark V. Derose, Seshira Koope #205, Suginamiku Kouenji Minami 1-7-21, 166-0003 Tokyo-to (JP)

( * ) Notice: Subject to any disclaimer, the term of this patent is extended or adjusted under 35 U.S.C. 154(b) by 0 days.

(21) Appl. No.: 09/757,497

(22) Filed: Jan. 11, 2001

Related U.S. Application Data

(60) Provisional application No. 60/209,977, filed on Jun. 8, 2000.

(51) Int. Cl.[7] .............................................. B65D 51/20
(52) U.S. Cl. .................................... 220/257; 206/459.5
(58) Field of Search ............................... 220/257, 258, 220/906; 206/459.5

(56) References Cited

U.S. PATENT DOCUMENTS

| | | |
|---|---|---|
| 3,981,412 A | 9/1976 | Asmus |
| 4,162,023 A | 7/1979 | Faltermeier |
| D274,792 S | 7/1984 | Price |
| 4,609,123 A | 9/1986 | Poncy |
| 4,708,257 A | 11/1987 | Deline |
| 4,895,270 A | 1/1990 | Main et al. |
| 4,927,048 A | 5/1990 | Howard |
| 5,108,003 A | 4/1992 | Granofsky |
| 5,119,955 A | 6/1992 | Granofsky |
| D332,403 S | 1/1993 | Johnson, III |
| 5,292,022 A | 3/1994 | Blanco |
| D353,328 S | 12/1994 | Nuffer |
| 5,647,497 A | 7/1997 | Labbe |
| 5,813,559 A * | 9/1998 | Cho ........................... 220/258 |
| 5,893,477 A | 4/1999 | Kaneko et al. |
| 5,934,495 A | 8/1999 | Chiodo |
| 5,934,497 A * | 8/1999 | Chang et al. |
| 6,015,059 A * | 1/2000 | Takayama ................... 220/258 |

FOREIGN PATENT DOCUMENTS

| | | | |
|---|---|---|---|
| EP | 385954 | 9/1990 | |
| GB | 2155897 | 10/1985 | |
| GB | 2156772 | 10/1985 | |
| JP | 54-130295 | 10/1979 | |
| JP | 2-258550 | 10/1990 | |
| JP | 10-214027 | * 10/1998 | ................ 220/258 |
| JP | 11-301668 | * 11/1999 | ................ 220/258 |
| WO | 89/11421 | 11/1989 | |

* cited by examiner

Primary Examiner—Nathan J. Newhouse
Assistant Examiner—Lien Ngo
(74) Attorney, Agent, or Firm—Richard C. Litman

(57) ABSTRACT

A protective seal for beverage cans and the like completely covers and seals the mouth contact area of the can, thereby protecting that area from contamination due to handling and storage. The present seal comprises a thin, durable, impervious sheet applied to the top of the can surrounding the opening area, extending down the upper side of the can adjacent the top opening area for a short distance. This comprises the mouth contact area of the can, and the seal completely seals and protects this area. The seal is sealed to the can surface by a narrow strip of food grade adhesive about the perimeter of the seal, with the adhesive passing around the front of the pop tab pull ring of the can top. The seal is also secured to the can by the conventional rivet securing the pull ring to the pop tab in easy opening type cans.

18 Claims, 5 Drawing Sheets

PROTECTIVE SEAL FOR CANS

CROSS-REFERENCE TO RELATED APPLICATION

This application claims the benefit of U.S. Provisional Patent Application Ser. No. 60/209,977, filed Jun. 8, 2000.

BACKGROUND OF THE INVENTION

1. Field of the Invention

The present invention relates generally to covers, caps, tops, and lids for containers, and more specifically to a protective seal which covers the area around the openable tab on a beverage can or the like. The present protective seal maintains a hygienic and sanitary area around the area of the tab and immediately below the tab on the side of the can before the can is opened, thereby providing a sanitary contact area for the mouth of a person consuming the contents of the can after opening.

2. Description of the Related Art

The consumption of beverages from cans has become ever more popular, perhaps due to the pace of modern life and the lack of time for many people to stop for refreshments at a cafe or the like. In any event, the marketplace has responded by providing a myriad of different flavors, types, and sizes of beverages in both bottles and cans, for purchase either over the counter or from vending machines.

A problem which is universal to the provision of such beverages in cans, is the handling of the cans before purchase and consumption. Even when such cans are prepackaged in six packs, cases, etc., the cans are almost always contaminated with dirt or grime from the packaging and shipping process. Most group type containers do not cover the tops of the cans to protect this area, but rather are simple distensible plastic rings which surround the tops of the cans to secure a group of cans together. This problem also exists for cans purchased from vending machines, as they must be separated by hand from any packaging and placed in the vending machine individually. The result of the handling and storage life of such canned products, is that the cans, and particularly the tops of the cans, are almost always contaminated with dust, grime, and/or hand contact from persons handling the cans before final purchase.

Accordingly, a need will be seen for a protective seal which is applied to the top of the can immediately after the can has been filled, while it is still in a sanitary and hygienic environment. The protective seal extends from the center of the top of the can where it is anchored by the conventional rivet of the pop tab opening, across the area of the pop tab and downwardly over the upper portion of the can adjacent the pop tab opening. The seal protects this mouth contact area of the can until it is removed by the consumer, thereby protecting the mouth contact area of the can from contamination and assuring the consumer that the mouth contact area of the can is sanitary before consumption of the contents.

A discussion of the related art of which the present inventor is aware, and its differences and distinctions from the present invention, is provided below.

U.S. Pat. No. 3,981,412 issued on Sep. 21, 1976 to Richard W. Asmus, titled "Container Closure," describes various lid or top embodiments for cans and bottles. In one embodiment (FIG. 12), a supplemental cover is secured to the top of a can by means of segmented helical protuberances stamped in the upper side walls of the can, to serve as screw threads for the cover. However, the elevation view in section of FIG. 12 of the Asmus patent, clearly shows that the sides of the cover do not seal against the sides of the can to provide a hygienic mouth contact area for the can, as provided by the present seal. Moreover, Asmus requires that the can be modified with the stamped thread portions, whereas cans used with the present invention do not require any modification.

U.S. Pat. No. 4,162,023 issued on Jul. 24, 1979 to Heinz J. Faltermeier, titled "Dust Cover For Flip Top Opening Containers," describes a sanitary cover which secures about the crimped upper edge of the can. The Faltermeier cover is relatively complex, as it has a multiple fold which extends beneath the lift tab of the pop tab opener for the can. In any event, the Faltermeier cover does not extend downwardly along the side of the can to a sufficient depth to cover the mouth contact area of the can, as provided by the present invention. Moreover, Faltermeier does not provide a positive seal nor any transparency for his cover, as provided by the present protective seal.

U.S. Pat. No. 4,609,123 issued on Sep. 2, 1986 to George W. Poncy, titled "Beverage Can With Sanitary Reclosable Lid," describes various can embodiments, each having a double upper top or lid. The outermost lid serves as a cover for the underlying lid, and also provides means for resealing the container if so desired. The upper or outermost lid is crimped to the upper edge of the can along with the inner lid, and thus cannot swivel relative to the lower lid or remainder of the can, as provided by the present seal. The outermost lid of the Poncy can includes a pop tab or the like therein, and acts just as the single conventional lid in a conventional can. Thus, Poncy provides only a resealing capability, and does not provide any additional sanitation or hygiene for the mouth contact portion of the can or lid. Moreover, the Poncy cover is not transparent, whereas the present seal is preferably transparent in order to show any underlying advertising messages or the like.

U.S. Pat. No. 4,708,257 issued on Nov. 24, 1987 to Douglas N. Deline, titled "Protective Seal For A Can," describes a flat, thin sheet of plastic film which is adhesively attached to the rim of a can to seal the upper surface thereof. A pull tab extends from one side for removing the cover partially from the upper lid of the can, to expose the conventional pop tab. While the Deline seal protects the lid or top of the can, it does nothing to protect the mouth contact area along the upper side of the can, adjacent the pop tab opening. Moreover, the Deline seal does not swivel for clearance from the opening, nor is it transparent.

U.S. Pat. No. 4,895,270 issued on Jan. 23, 1990 to Daniel M. Main et al., titled "Sanitary Cover For Pop-Top Beverage Container," describes various embodiments of a thin latex cover which is applied over the upper end of a can to protect that portion of the can. The cover includes weakening lines for tearing the cover at least partially, for exposing the underlying can top and its pop tab. However, Main et al. do not provide any positive attachment for their cover by means of the conventional pop tab rivet, as provided by the present invention. This allows the present protective seal to be swiveled out of the way after the adhesively attached edges are lifted, unlike the Main et al. cover. Moreover, Main et al. are silent regarding any transparency for their cover, whereas the present seal may be transparent.

U.S. Pat. No. 4,927,048 issued on May 22, 1990 to Roy T. Howard, titled "Beverage Can Having A Sanitary Cover," describes a cover formed of a thin aluminum sheet which closely adheres to the contours of the can top. However, the only portion of the Howard cover which extends beyond the can top, is for the pull tab extension which wraps downwardly slightly below the upper rim of the can. Accordingly, the Howard cover does not appear to cover and protect the entire mouth contact area of the can, as does the present seal, particularly in view of the fact that the Howard lift tab must not be sealed to the can in order to allow it to be lifted easily for removing the cover. Also, the aluminum material of the Howard cover precludes transparency, which is provided by the present sanitary protective seal.

U.S. Pat. No. 5,108,003 issued on Apr. 28, 1992 to Barry P. Granofsky, titled "Cover For Beverage Can," describes a non-swivel cover which extends over the entire top of the can. A circumferential pull tab provides for release of the portion of the cover which extends over the opening in the upper lid of the can. A cap is included beneath the removable portion of the cover, for resealing the can as desired. Accordingly, the Granofsky cover cannot be used with a conventional can with a pop tab opening, as the attachment edge of the pop tab would preclude a good fit and seal for a plug type cap, as provided by Granofsky. Moreover, Granofsky is silent regarding any transparency for his cover.

U.S. Pat. No. 5,119,955 issued on Jun. 9, 1992 to Barry P. Granofsky, titled "Sanitary Can Closure," describes a cover closely resembling that of the '003 U.S. Patent to the same inventor, discussed above. Accordingly, the same points of distinction noted above between the cover of the '003 Granofsky U.S. Patent and the present invention, are seen to apply here as well.

U.S. Pat. No. 5,292,022 issued on Mar. 8, 1994 to Arsenio G. Blanco, titled "Closure For Beverages Metal Containers," describes two different embodiments for such covers, with one embodiment covering only the pop tab opening area of the can. This cover is opened as the pop tab is pulled. The other embodiment covers the entire top of the can, but is split diametrically as the can is opened to roll clear of the opening. Neither embodiment extends downwardly to cover the mouth contact area of the can below the rim, and no transparency is described by Blanco.

U.S. Pat. No. 5,647,497 issued on Jul. 15, 1997 to Andre Labbe, titled "Protective Removable Cover For Beverage Container," describes various embodiments of such covers. Most of the embodiments cover the entire top of the can, unlike the present seal invention, but Labbe does not provide for complete coverage of the mouth contact area of the can by extending his cover downwardly over the side of the can past the rim to cover the lower lip contact area, as provided by the present seal. In one embodiment, Labbe provides only a partial top cover, but teaches away from the present seal invention by avoiding the rivet attachment area for the pop tab. This precludes any swivel attachment for the Labbe seal, with the seal thus separating completely from the can after opening. In contrast, the present seal remains attached by the pop tab rivet, precluding its loss and possible littering. Also, Labbe is silent regarding any transparency for his covers, whereas the present seal may be made transparent (or at least translucent), allowing any advertising or other matter beneath the seal to be visible to the consumer.

U.S. Pat. No. 5,893,477 issued on Apr. 13, 1999 to Masamichi Kaneko et al., titled "Receptacle For Liquids," describes a cover which closely resembles that of the Deline '257 U.S. Patent, discussed further above. The same differences and distinctions noted between the cover of the Deline '257 U.S. Patent and the present invention, are also felt to apply here.

U.S. Pat. No. 5,934,495 issued on Aug. 10, 1999 to Maurizio Chiodo, titled "Protective Film For Cans Or Drink And Food Containers In General," describes different embodiments of a cover or seal for beverage cans. In one embodiment, the seal completely covers the entire can. While the side of the can is apparently visible through the seal film, the upper end of the can is obviously not visible, as indicated by the broken line showing of the pop tab and lift ring. In contrast, the entire seal of the present invention is transparent, allowing advertising or the like to be viewed through the seal. Moreover, the Chiodo seal embodiments which cover only the top of the can do not extend downwardly past the top to protect the lower lip contact area of the can, as provided by the present seal. Chiodo also covers the entire top of the can, precluding swiveling his seal out of the way but allowing it to remain attached to the can, as provided by the present seal invention.

U.S. Pat. No. 5,934,497 issued on Aug. 10, 1999 to Charles Chang et al., titled "Sanitary Beverage Can Lid," describes a specially formed lid for a can, rather than a removable cover. The Chang et al. lid is permanently and immovably attached to the can at manufacture, rather than being a movable or removable cover for a portion of a fixed lid, as in the present invention. The Chang et al. lid is configured to provide ease of access to the surface adjacent the opening area, for ease of cleaning that surface. However, Chang et al. do nothing to protect that area in the first place, nor do they protect the upper side of the can.

U.S. Pat. No. 6,015,059 issued on Jan. 18, 2000 to Yoshikazu Takayama, titled "Can With Seal," describes various embodiments of covers or seals for the tops of cans. One embodiment (FIG. 8) adheres to the top of the can around its periphery, but attaches only to a portion of the top of the can; the Takayama seal does not extend downwardly to protect the lower lip contact portion of the can, as does the present seal. Takayama is silent regarding any means for pivoting or swiveling his seal to a position opposite the opening in the top of the can, as provided by the present invention. Also, no disclosure is made by Takayama of any transparency for his cover, as provided by the present seal.

U.S. Pat. No. D-274,792 issued on Jul. 24, 1984 to Floyd J. Price, titled "Sealing Cap For Soda Cans Or The Like," illustrates a design having a circular cross section rim with an overlying cover. The design is apparently opaque, does not attach to the rivet of the pull tab of a can, is completely separable from the can, covers the entire top of the can, and does not cover any of the side portion of the can below the crimped rim of the top, all of which features are opposed to those of the present invention.

U.S. Pat. No. D-332,403 issued on Jan. 12, 1993 to John H. Johnson, III, titled "Can Cap," illustrates a design which appears to have an extension for inserting into the opened opening of a pop tab type can. Otherwise, the various features noted in the discussion of the design of the Price '792 U.S. Patent immediately above, also apply to the Johnson, III design and teach away from the structure and features of the present can seal.

U.S. Pat. No. D-353,328 issued on Dec. 13, 1994 to Richard Nuffer, titled "Pop Top Can Cover," illustrates a design comprising a retaining ring having a cover attached thereto by a live hinge. The design does nothing to protect the lower lip contact area of the can below the opening, and is not permanently attached to the can as in the case of the present seal. Moreover, the Nuffer design is opaque, rather than transparent, and covers the entire top of the can, unlike the present seal invention.

Japanese Patent Publication No. 54-130,295 published on Oct. 9, 1979 to Sekisui Chemical Company, Ltd., describes (according to the drawings and English abstract) a cup and cover assembly, in which the cover is permanently sealed to the upper edge of the cup. The cover has an overlay including an area defined by lines of weakening to provide a tear away strip to expose an underlying opening in the lower cover sheet. The assembly is not configured for use with a pop tab type can, does not protect the area surrounding the opening or along the upper sidewall portion of the container, does not retain the removed seal portion, and is not transparent, all of which are features of the present seal invention.

British Patent Publication No. 2,155,897 published on Oct. 2, 1985 to Scottish & Newcastle Breweries Plc, titled "Seals For Liquid Containers," describes the manufacture of seals for larger containers, i.e., beer kegs. The seals are applied to a continuous length of carrier material, with a continuous length of string or the like looped under each seal. The string is cut when each seal is applied to a keg, with the free end(s) of the string extending from beneath the seal to provide for ease of removal. The seals themselves bear no resemblance in structure or function to the present can seal invention.

British Patent Publication No. 2,156,772 published on Oct. 16, 1985 to Jorge M. Burcat, titled "A Beverage Can," describes a two piece seal for use with removable pull tab type openers. The seal extends across the pull tab and downwardly over the lower lip contact area of the can, but is completely removed from the can when the pull tab is removed, whereas the present seal remains attached to the can and swivels clear of the opening. Burcat is silent regarding any transparency for his seal.

PCT Patent Publication No. 89/11,421 published on Nov. 30, 1989 to Jacques Boisson et al. describes (according to the drawings and English abstract) several embodiments of seals or covers for can tops, with the closest embodiment to the present invention apparently being illustrated by FIGS. 1 and 2. The seal of the '421 PCT Publication extends over the pull tab opening area of the can and downwardly over the lower lip contact area of the sidewall of the can. The seal is only secured to the can adhesively; it is not secured in place mechanically, as by securing it beneath the pop tab ring of the can, as in the present invention. However, the English abstract states that the protective film remains attached to the container, with FIG. 2 showing the removal of the pull tab and the film clinging to the sidewall of the can immediately adjacent the top opening. This is obviously cumbersome, as both the attached pull tab and the loosened flap of the seal impinge upon the lower lip contact area of the can and preclude the comfortable consumption of the contents of the can. The present invention overcomes this problem by pivoting or swiveling the seal around the pop tab rivet to the opposite side of the can from the opening. While it is noted that FIG. 13 of the '421 PCT Publication illustrates the attachment of a secondary cover by means of a central rivet in the top of the can, the secondary cover in this embodiment is circular and cannot be swiveled to provide clearance for accessing the can opening. Rather, at least one side of the cover is peeled upwardly to expose the opening in the can, and must be held in that position during consumption of the can contents. No suggestion of any combination of the embodiments of FIGS. 1 and 2 and FIG. 13 is made in the '421 PCT Patent Publication, nor is any indication of transparency noted.

European Patent Publication No. 385,954 published on Sep. 5, 1990 to Ferruccio Canini, titled "Device For Hygienic Protection Of Drinks, Edible Liquids And Other Products In General," describes several embodiments of a can seal. In the embodiment of FIG. 1, the seal does not cover any of the can side, thus allowing the lower lip to contact a possibly contaminated area of the can even after the seal has been removed. The embodiment of FIG. 9 appears most closely related to the present invention, but is more closely related to the embodiment of FIGS. 1 and 2 of the '412 PCT Patent Publication discussed immediately above. The same differences noted in that discussion, are seen to apply here.

Finally, Japanese Patent Publication No. 2-258,550 published on Oct. 19, 1990 to Arai Minoru describes (according to the drawings and English abstract) a retainer for an otherwise removable pull tab for a can. The retainer is a generally circular device seated in the circumferential groove in the top of the can. It is attached to the pull tab and also to the top or adjacent side of the can, opposite the pull tab. When the tab is pulled to open the can, it remains attached to the retainer, which remains attached to the opposite side of the can to preclude loss of the removed tab. The device does nothing to protect the mouth contact area of the can from contamination, nor to protect a person consuming the contents of the can, as provided by the present seal.

None of the above inventions and patents, either singly or in combination, is seen to describe the instant invention as claimed.

SUMMARY OF THE INVENTION

The present invention comprises a protective seal for cans, for sealing the mouth contact area of an otherwise conventional beverage can or the like to protect that area from contamination during handling and storage. The seal is adhesively secured to the top of the can around the pop tab opening and along the upper side of the can adjacent the opening, and is further attached to the can by the rivet securing the pop tab pull ring to the can. The seal is preferably formed of a transparent material so that any advertising or other message provided on the surface of the can below the protective seal, may be read by the consumer.

A person consuming the contents of the can peels back the seal and pivots the seal around the pop tab rivet to the opposite side of the can, then opens the pop tab to consume or pour the beverage with assurance that the mouth contact area of the can has remained in a sanitary condition. The seal remains attached to the can at all times due to its attachment to the pop tab ring attachment rivet and thus cannot be discarded separately from the can, thereby reducing litter. The seal is preferably formed of a thin, durable, biodegradable plastic or other suitable sheet material, in order for the can and seal assembly to be recycled after use and to reduce waste. As noted above, the seal is preferably transparent, but may be tinted or shaded as desired to provide an attractive appearance. The seal may also include instructions, an advertising message(s), etc. thereon, if so desired.

Accordingly, it is a principal object of the invention to provide an improved protective seal for cans, with the seal covering the top of the can in the area of the opening therein and the upper side of the can adjacent the opening, thereby protecting the mouth contact area of the can from contamination.

It is another object of the invention to provide an improved protective seal for cans, which seal is formed of a thin, flexible, durable, impervious sheet of plastic or other suitable material.

It is a further object of the invention to provide an improved protective seal for cans which seal is adhesively secured to the can generally about the periphery of the seal.

An additional object of the invention is to provide an improved protective seal for cans which seal is also mechanically secured to the top of the can by means of the conventional pop tab pull ring attachment rivet provided with the can, thereby providing for the seal to be pivoted to the opposite side of the can from the opening in the top of the can after separating the adhesive attachment of the seal to the can.

Still another object of the invention is to provide an improved protective seal for cans which is transparent or translucent, and which may include instructional and/or other messages thereon.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a protective seal for beverage cans and the like, applied at the time of sealing the contents in the can. As the filling of the can is accomplished under necessarily hygienic conditions in order to protect the interior of the can and its contents, the application of the present seal at that time assures that the underlying surface will retain its hygienic condition. The present protective seal covers the mouth contact area of the can, thereby assuring the consumer that this mouth contact area remains sterile and hygienic and is not contaminated by dirt, dust, spilled substances, etc. during shipping and handling.

Figure 1:
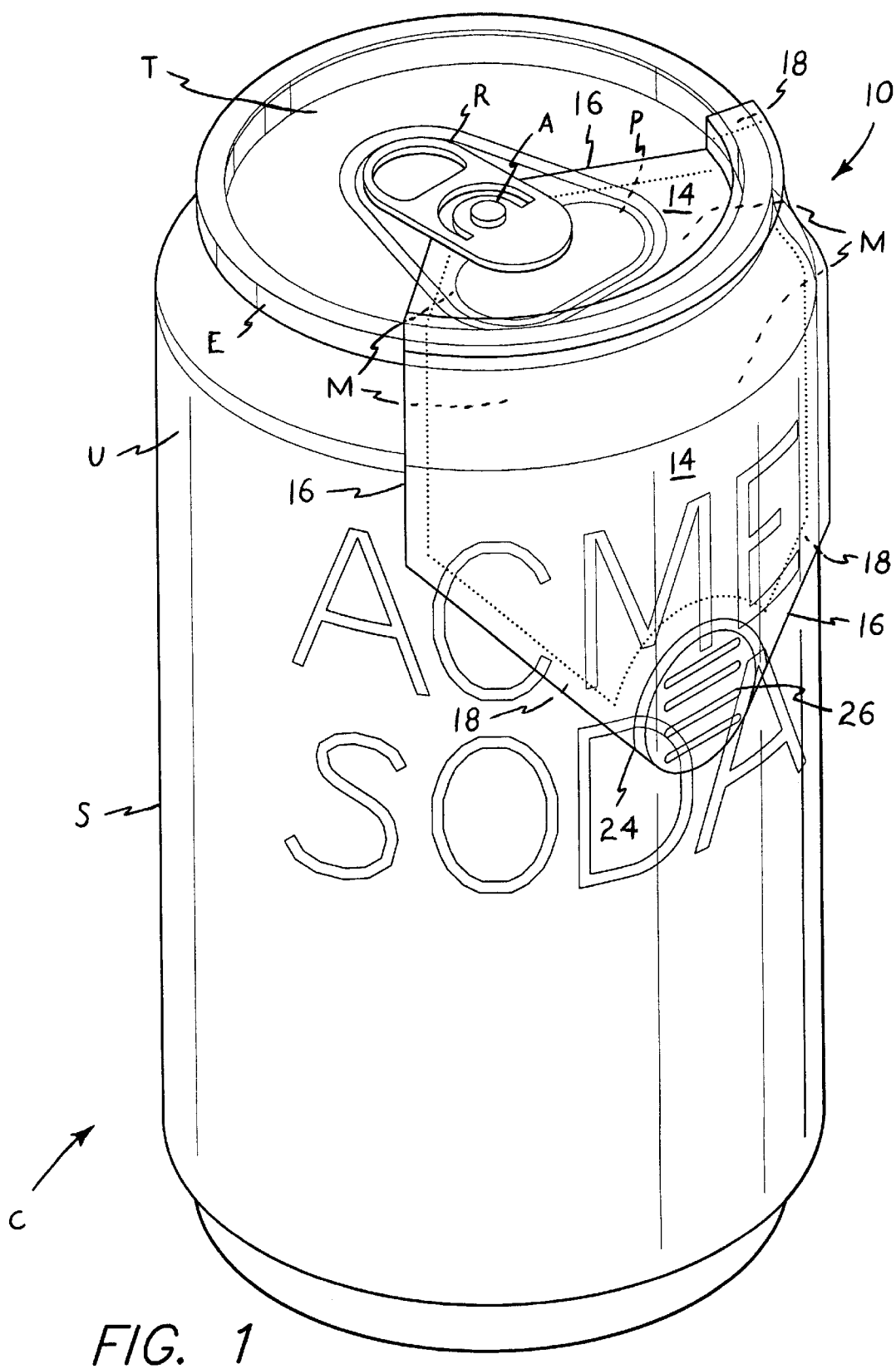
FIG. 1 is a top and front perspective view of a beverage can equipped with the present protective seal, showing its general configuration.

FIG. 1 of the drawings provides a perspective view of a can C incorporating the present protective seal 10 therewith. The can C is conventional with the exception of the seal 10 disposed thereon, with the can C essentially comprising a bottom (not shown, and not critical to the present invention), a sidewall S and a top T. The top T is conventionally formed of a separate sheet of material from the sidewall S, and is crimped and sealed in place to the upper edge of the sidewall S, as is conventional in such practice. The top T includes a conventional pop tab assembly, comprising a pop tab P which is conventionally stamped into the top T to define a sealed opening within the top T. A pop tab pull ring R is attached to the pop tab P by an attachment rivet A.

When the pop tab P is opened, it defines an opening O (shown in FIG. 5) from which the contents of the can C are poured or consumed. This opening is conventionally positioned from a point near the edge E of the top T, to a bend line opposite the rivet A. A person drinking directly from the can C would place his/her mouth in this area, with the upper lip extending laterally to each side of the opening O and the lower lip contacting the upper sidewall U of the can C directly below the opening O defined by the pop tab P. This area comprises the mouth contact area M for a conventional can C, and the seal 10 provides a means for keeping this mouth contact area M in a clean and hygienic condition. Even when a beverage is poured from the can C to another container (glass, cup, etc.), the beverage flows at least partially over this mouth contact area M, with the seal 10 providing a hygienic surface before pouring.

The seal 10 is formed of a thin, flexible, durable, impervious sheet of material, such as a thin plastic or other suitable material. The sheet 10 material is preferably biodegradable and is destroyed by the heat developed during the recycling process used with the cans C, thereby avoiding additional litter and waste. Various polymers and other thin sheet materials are known to have the desired characteristics of the present protective seal 10, and may be used as desired. The present seal 10 is preferably quite thin in order to allow a series of such cans C equipped with the present seal 10 to be stacked atop one another without appreciable interference by the thickness of the seals 10, and to adhere and conform closely to the contours of the can C, particularly the crimped edge E of the top T. It will be noted that the thickness of the protective seal 10 is greatly exaggerated throughout the drawing Figures, to provide clarity in the drawings.

Figure 2:
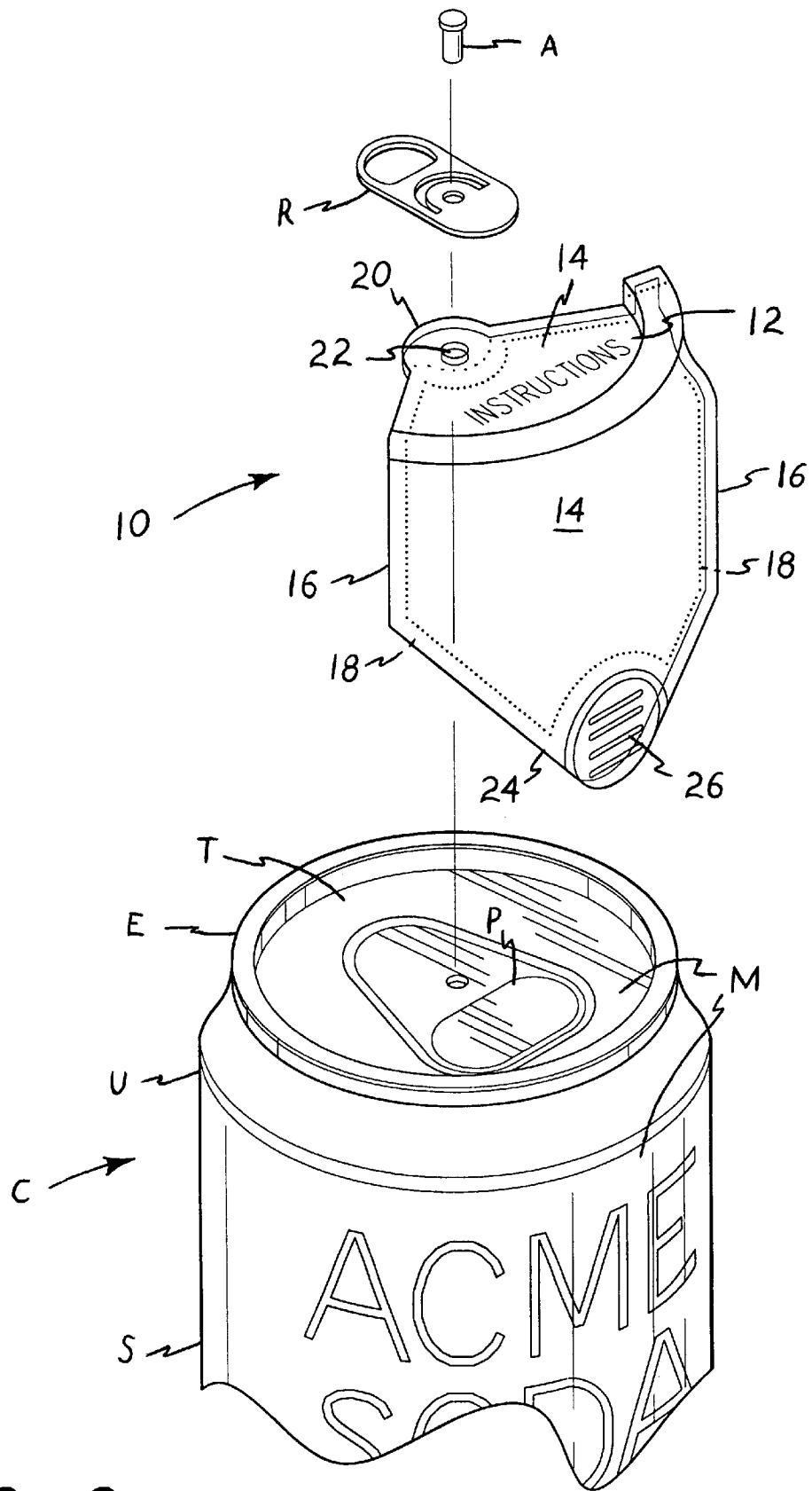
FIG. 2 is an exploded perspective view of the upper portion of the can and seal assembly of FIG. 1.
Figure 4:
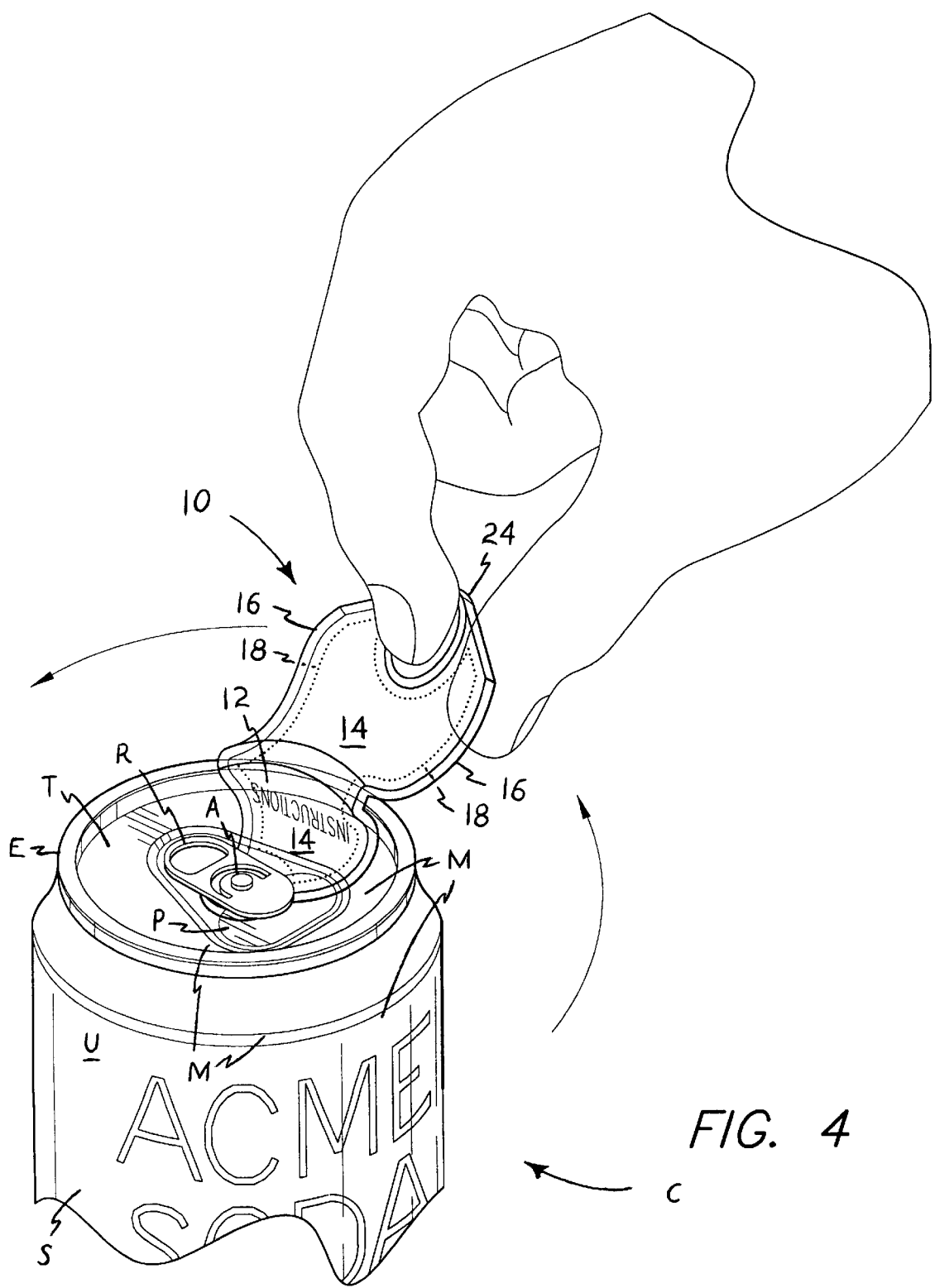
FIG. 4 is a perspective view of the upper portion of the can and seal assembly of FIG. 3, showing the second step in the unsealing and opening process.
Figure 5:
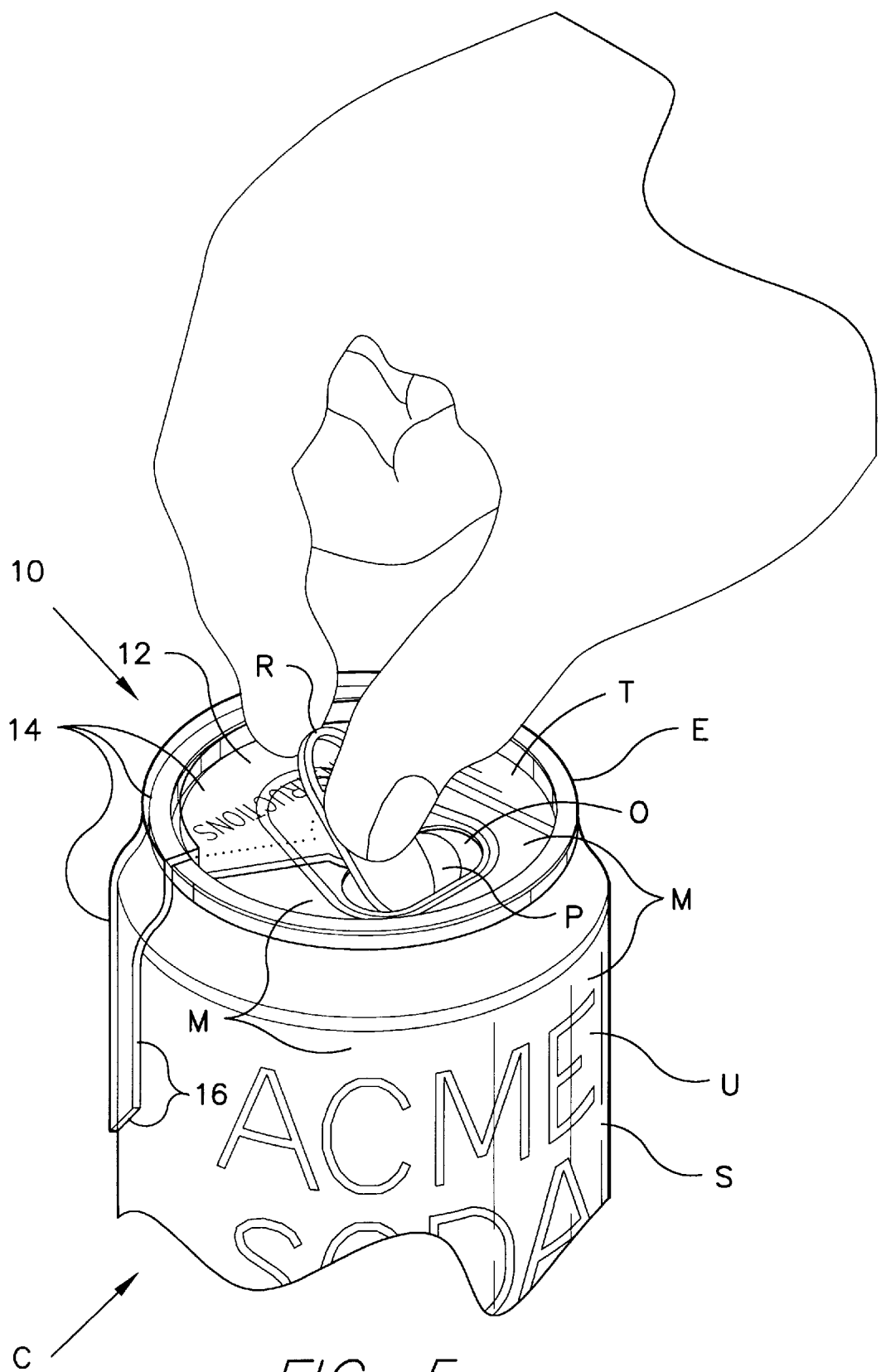
FIG. 5 is a perspective view of the upper portion of the can and seal assemblies of FIGS. 3 and 4, showing the final step in the process of opening the can.

The present seal 10 is preferably transparent as shown throughout the drawing Figures, in order to allow consumers to inspect the underlying surface of the can C for damage and to allow any decoration, advertising indicia, etc. to be viewed through the seal 10. However, a tint or shading may be added to at least some portion of the seal 10 (e. g., the area covering the top T of the can C, which normally remains plain and unadorned) in order to show clearly the extent of the seal 10. In addition, the seal 10 is capable of accepting some form of message(s) thereon, e. g., instructions 12 for opening the seal 10, as shown in FIGS. 2, 4, and 5, or advertising, decorative embellishment, etc., as desired.

The protective seal or sheet 10 includes a mouth contact coverage area 14, which is in general overlying registry with and extends at least slightly beyond the mouth contact area M of the can C. This mouth contact coverage area 14 of the seal 10 is surrounded and defined by a periphery 16, with the periphery 16 including some form of sealing means 18 (a food grade adhesive, heat sealing, separate tape, etc.) disposed between the periphery 16 and the surface of the can C surrounding the mouth contact area M (except the seal extension 20 portion of the sheet 10, which provides for mechanical attachment of the sheet 10 to the pop tab assembly, as discussed below). The sealing means 18 comprises a continuous ring of sealing material surrounding the mouth contact area M of the can C, thereby precluding the entrance of dirt, dust, and/or other contamination between the seal 10 and the mouth contact area M of the can C.

The seal 10 is secured to the can C by more than adhesive means. While others have used such adhesives for attachment, this generally results in the complete removal of the seal, and the resulting additional piece of debris once the seal is removed. In contrast, the present seal 10 is also mechanically secured to the can C by a seal extension 20 (shown in FIG. 2) extending beyond the mouth contact coverage area 14 of the upper portion of the seal, and sandwiched between the pop tab P and its overlying pop tab pull ring R. The seal extension 20 is secured between the pop tab P and pull ring R by the rivet A, which passes through a hole 22 in the seal extension 20 as shown in FIG. 2.

Figure 3:
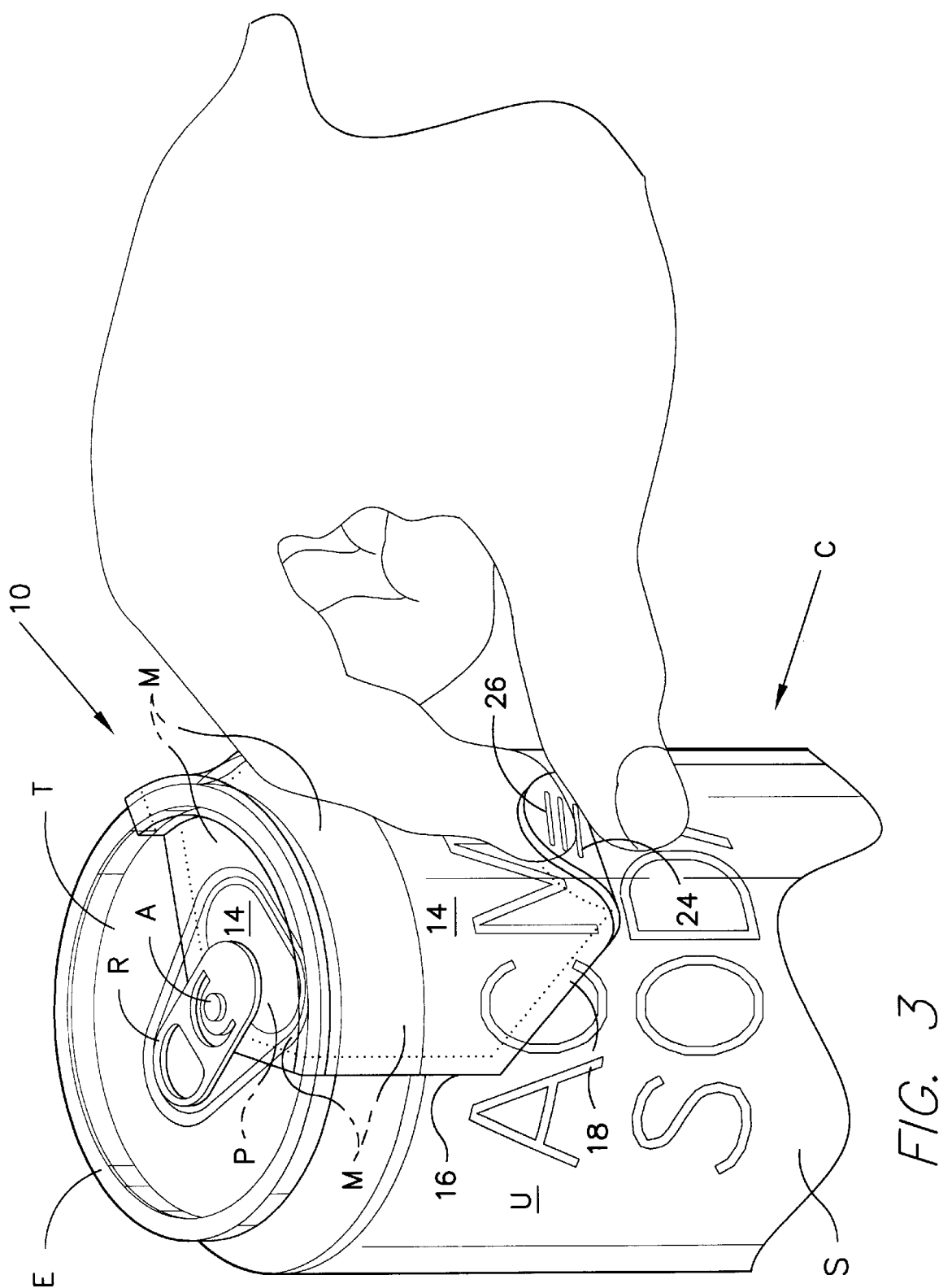
FIG. 3 is a perspective view of the upper portion of the can and seal assembly, showing the first step in the opening of the seal and can.

The opposite lower end portion of the seal 10 includes a grip extension 24, which may include some form of high friction grip means 26 disposed thereon (embossed, etc.). It will be noted that the adhesive or sealing band 18 does not extend to the extreme end of the upper seal extension 20, which is secured to the pop tab assembly, nor to the extreme end of the grip extension 24; FIG. 2 illustrates this point particularly well. This allows the consumer to lift the grip extension 24 easily, without having to remove any adhesive or the like between the extension 24 and the underlying side S surface of the can C. Once the grip extension 24 has been lifted, the consumer may easily peel the lower mouth contact coverage portion 14 of the seal 10 from the mouth contact area M on the side of the can C, as shown in FIG. 3 of the drawings.

Once the consumer has lifted the seal 10 from the top T of the can C, all of the sealing means 18 will be separated from the can C, generally as shown in FIG. 4 of the drawings. The only remaining area of the seal 10 which remains secured to the can is the seal extension 20, riveted between the pop tab P and the pop tab pull ring R. As the generally peripheral sealing means 18 does not surround the rivet attachment, all of the seal 10 is separated by lifting the grip extension 24 upwardly above the top T of the can C, as shown in FIG. 4. The seal 10 may then be swiveled around its attachment to the rivet A to position it to the opposite side of the can C from the tab P, as shown in FIGS. 4 and 5, allowing the consumer to open the pop tab P and pour or consume the contents of the can C freely without the seal 10 interfering.

In summary, the present protective seal provides a much needed advance in consumer hygiene, by protecting the mouth contact area of a beverage can or the like from potential contamination from dirt, foreign matter, etc. between manufacture and sale to the consumer. The present seal is an advance over other devices developed in the past, particularly by means of the two independent methods of securing the seal to the can. The adhesive or other sealing means used generally about the periphery of the seal assures that no foreign matter will enter between the seal and the mouth contact area of the can, while the mechanical attachment by means of the conventional pop tab rivet assures that the seal will remain in place on the can, and may be discarded with the can when the can has been emptied. The rivet attachment allows the seal to be pivoted or swiveled completely clear of the mouth contact area of the can and the pop tab, thereby providing free access to the contents of the can.

The transparency, or at least translucence, of the present seal also provides advantages over seals of the prior art. The present seal is quite thin, which with its transparency, provides an unhindered view of the design disposed upon the can surface. The result is to provide a seal which is unobtrusive and easily opened, yet highly effective in providing a hygienic seal for the mouth contact areas of beverage cans and the like.

It is to be understood that the present invention is not limited to the sole embodiment described above, but encompasses any and all embodiments within the scope of the following claims.

I claim:

1. A beverage can having a pop tab assembly in combination with a seal, comprising:

a can having a top and a side wall, the can being adapted for containing a beverage;

a pop tab assembly including:
   a pop tab stamped into the top, the pop tab defining a sealed opening;
   a pop tab pull ring; and
   a rivet connecting said pop tab pull ring to the top so that said pop tab pull ring may be rotated about said rivet in order to break open the sealed opening to provide access to a beverage;

a durable thin, flexible, impervious, and transparent sheet of material defining a seal and having a first end and a periphery, the sheet having a substantially triangular first portion covering an area of the top over said pop tab and a second portion covering an area of the side of said can so that the sheet covers an area of the top and the side of the can contacted by a user's mouth;

a seal extension extending from the first end of said sheet; and adhesive means for forming a seal between the periphery of said sheet and said can, provided that the seal extension is not sealed to said can;

wherein the seal extension is disposed between said pop tab pull ring and the top, said rivet extending through said pop tab pull ring, the seal extension, and the top in order to retain said seal on said can; and wherein said seal is capable of pivoting horizontally about said rivet when the adhesive means is broken to provide access to the opening in the top of said can.

2. The beverage can in combination with a seal according to claim 1, wherein said sheet has a second end opposite the first end and further comprises a grip extension extending from the second end, the grip extension terminating the second portion of said sheet.

3. The beverage can in combination with a seal according to claim 2, wherein the grip extension end comprises an embossed region without adhesive means whereby the grip extension end may be grasped and pulled to break the seal provided by said adhesive means.

4. The beverage can in combination with a seal according to claim 1, wherein said sheet is made from a biodegradable material.

5. The beverage can in combination with a seal according to claim 1, wherein said adhesive means comprises a food grade adhesive.

6. The beverage can in combination with a seal according to claim 1, wherein said adhesive means comprises a heat seal.

7. The beverage can in combination with a seal according to claim 1, wherein said adhesive means comprises a strip of adhesive tape.

8. The beverage can in combination with a seal according to claim 1, wherein said sheet is partially tinted to provide a contrast and yet enable a clear view of any design and advertisement on the surface of the can.

9. The beverage can in combination with a seal according to claim 1, further comprising indicia disposed on said sheet.

10. A beverage can seal for attachment to a beverage can having a top and a side wall, a pop tab stamped into the top defining a sealed opening, a pop tab pull ring, and a rivet connecting the pop tab pull ring to the top, the seal comprising:

a durable thin, flexible, impervious, and transparent sheet of material defining a seal and having a first end and a periphery, the sheet having a substantially triangular first portion for covering an area of the top over the pop tab and a second portion covering an area of the side of said can so that the sheet covers an area of the top and the side of the can contacted by a user's mouth;

a seal extension extending from the first end of said sheet; and adhesive means for forming a seal between the periphery of said sheet and the can, provided that the seal extension is not sealed to the can;

wherein said seal is retained on the can between the pop tab pull ring and the top by the rivet extending through the seal extension and wherein the seal is capable of pivoting horizontally about the rivet when the adhesive means is broken to provide access to the opening in the top of said can.

11. The beverage can seal according to claim 10, wherein said sheet has a second end opposite the first end and further comprises a grip extension extending from the second end, the grip extension terminating the second portion of said sheet.

12. The beverage can seal according to claim 11, wherein the grip extension end comprises an embossed region without adhesive means whereby the grip extension end may be grasped and pulled to break the seal provided by said adhesive means.

13. The beverage can seal according to claim 10, wherein said sheet is made from a biodegradable material.

14. The beverage can seal according to claim 10, wherein said adhesive means comprises a food grade adhesive.

15. The beverage can seal according to claim 10, wherein said adhesive means comprises a heat seal.

16. The beverage can seal according to claim 10, wherein said adhesive means comprises a strip of adhesive tape.

17. The beverage can seal according to claim 10, wherein said sheet is partially tinted to provide a contrast and yet enable a clear view of any design and advertisement on the surface of the can.

18. The beverage can seal according to claim 10, further comprising indicia disposed on said sheet.

* * * * *